United States Patent [19]

Chueh

[11] Patent Number: 5,831,778

[45] Date of Patent: Nov. 3, 1998

[54] DEVICE FOR LENSES OF VARIOUS LENGTHS

[75] Inventor: Chuang-hua Chueh, Taipei Hsien, Taiwan

[73] Assignee: Behavior Tech Computer Corp., Taipei, Taiwan

[21] Appl. No.: 877,389

[22] Filed: Jun. 18, 1997

[51] Int. Cl.$^6$ .................................................. G02B 7/02
[52] U.S. Cl. ........................................... 359/829; 359/823
[58] Field of Search ..................................... 359/829, 830, 359/694, 699, 700, 704

[56] References Cited

U.S. PATENT DOCUMENTS 3,817,601  6/1974  Colaiace et al. ...................... 359/823
4,568,165  2/1986  Ishibashi .............................. 354/195.1
5,198,932  3/1993  Takamura ................................. 359/694
5,299,067  3/1994  Kutz et al. ............................... 359/827
5,587,754  12/1996 Katayama ................................ 396/144
5,636,064  6/1997  Nomura et al. .......................... 359/704
5,668,670  9/1997  Nakayama et al. ...................... 359/694

*Primary Examiner*—Georgia Y. Epps
*Assistant Examiner*—Ricky Mack
*Attorney, Agent, or Firm*—Holland & Hart LLP

[57] ABSTRACT

A device for lenses of different lengths enables a user to replace different lenses of different lengths by only removing parts of the device without replacing a whole set of the device.

4 Claims, 4 Drawing Sheets

5,831,778

DEVICE FOR LENSES OF VARIOUS LENGTHS

FIELD OF THE INVENTION

The present invention generally relates to a device for lenses of different lengths, and more particularly to a device which is able to accommodate different lenses having different lengths without changing any other accessaries.

BACKGROUND OF THE INVENTION

As the pace of the world goes faster and faster, everything gradually turns into automatic or semi-automatic. It is not because people become lazy, it's because people have less time to deal with unimportant things. People have to save their energy for a bigger goal, and that's why everything is simplified as much as it can be.

A conventional device for a lens of a CCD is shown in FIG. 6. The device comprises a seat 50 defining a circular through hole 51 and forming internal threadings therein, and a resilient plate 52 having a first end (not numbered) mounted thereon and a second end 53 vertically extending into the circular through hole 51, lens means 60 which is so-configured that a circular protrusion 61 thereof forming outer threadings 62 thereon is able to threadingly connect with the seat 50 and a zooming device 70 tightly connected with a flange 63 integrally formed relative to the circular protrusion 61 of the lens means 60. When all the previously described elements are assembled, a user is able to alter the focus of the device by rotating an outer circumference of the zooming device 70. Because a depth of the circular through hole 51 of the seat 50 is limited corresponding to a length of the circular protrusion 61, it is impossible to replace the lens means 60 with another lens means having a circular protrusion 61 of different length. Accordingly, when a user is trying to use another lens means having a circular protrusion of different length, it is necessary for the user to replace the entire set of the device. Therefore, an alteration of the device to overcome the described problem is necessary to fulfill the needs of users.

A device constructed in accordance with the present invention tends to mitigate and/or obviate the aforementioned problems.

SUMMARY OF THE INVENTION

The main objective of the invention is to provide a device for lenses of various length. The device is composed of a seat having a centrally defined through hole, an adjusting seat having a tubular projection threadingly received within the through hole of the seat, and an adjusting ring secured on a periphery thereof and a lens member securely received within the adjusting seat. Due to the lens member being securely received within the adjusting seat, rotation of the adjusting seat will accordingly initiate an alteration of focus of the lens member. When substituting with another lens member having a different length, a user will only need to remove the adjusting seat together with the lens member without removing the seat. Thus, the device constructed in accordance with the present invention is economically efficient.

Other objects, advantages and novel features of the invention will become more apparent from the following detailed description when taken in conjunction with the accompanying drawings.

BRIEF DESCRIPTION OF THE DRAWINGS

The present invention will now be better understood with reference to the accompanying drawings wherein.

DETAILED DESCRIPTION OF THE PREFERRED EMBODIMENT

Figure 1:
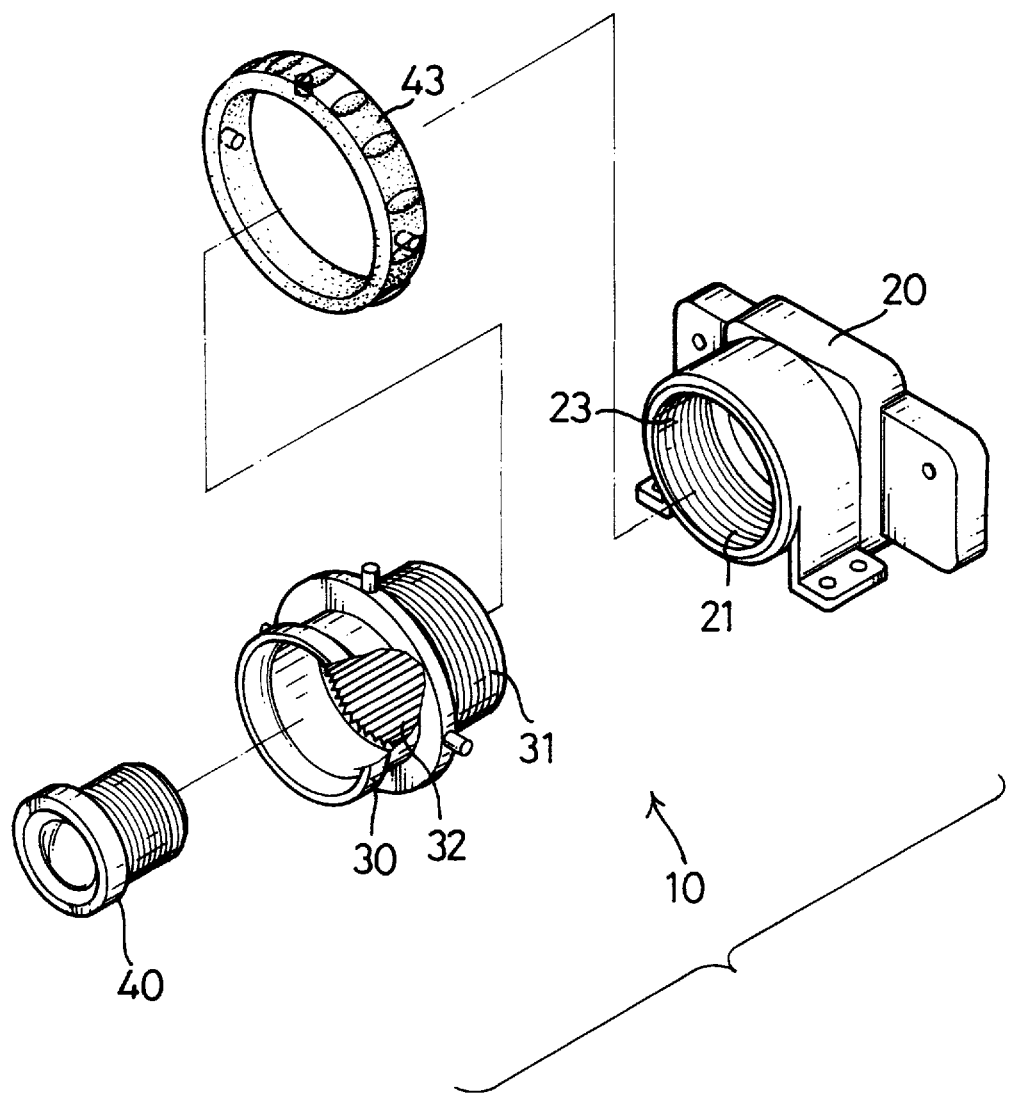
FIG. 1 is an exploded view of a device constructed in accordance with the present invention.

Referring to FIG. 1, one preferred embodiment of a device 10 constructed in accordance with the present invention that can be applied to lens members of different lengths is shown. The device 10 is configured to have a seat 20 having a centrally defined through hole 21 provided with threading 23 onto an internal face thereof, an adjusting seat 30 having a tubular projection 31 threadingly received within the through hole 21 of the seat 20, and an adjusting ring 43 secured on a periphery thereof and a lens member 40 securely received within the adjusting seat 30. The tubular projection 31 of the adjusting seat 30 has undulated teeth 32 integrally formed within an inner face (not numbered) thereof and the lens member 40 is so sized that when the lens member 40 is inserted into the tubular projection 31 of the adjusting seat 30, the tubular projection 31 provides a tight fit with the lens member 40.

Figure 3:
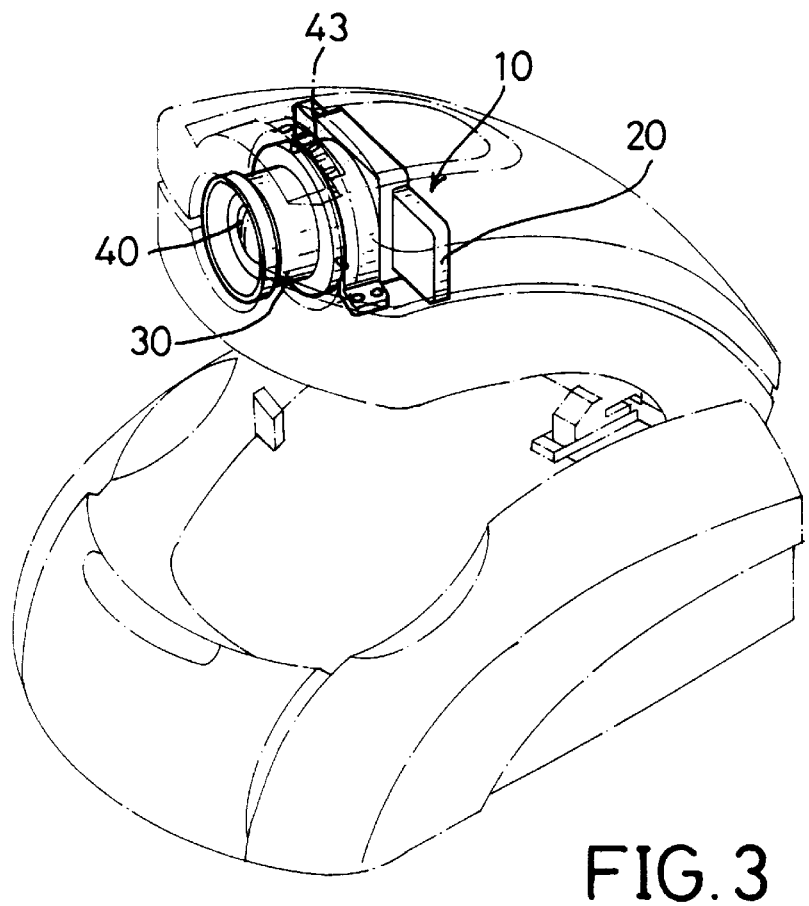
FIG. 3 is an embodiment of the present invention.
Figure 2:
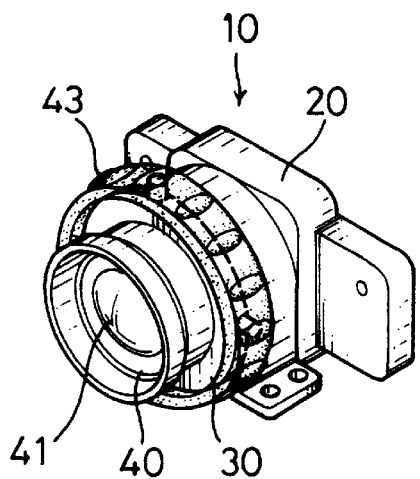
FIG. 2 is a perspective view of the device.

Referring to FIGS. 2 and 3, when the device is assembled, the adjusting seat 30 is able to be rotated by means of the adjusting ring 43 and thus the focus of the lens member 40 is altered. Due to the mounting of the adjusting ring 43 onto the adjusting seat 30 and the rotating of the adjusting seat 30 to alter the focus of the lens member being well known in the art, detailed descriptions of said techniques are omitted.

Figure 5:
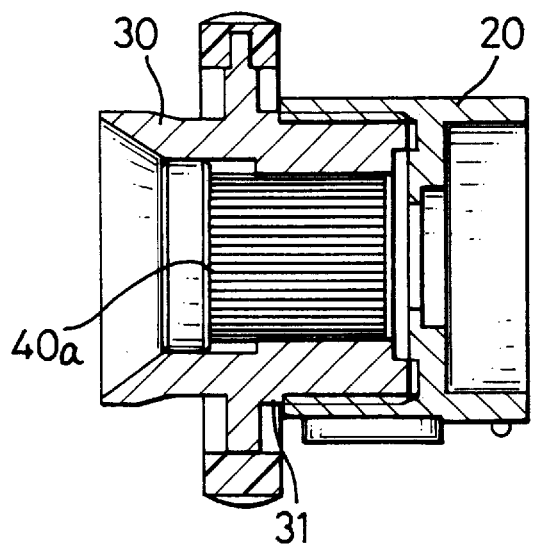
FIG. 5 is a schematic view of the present invention showing a different lens member of different length applied thereto.
Figure 4:
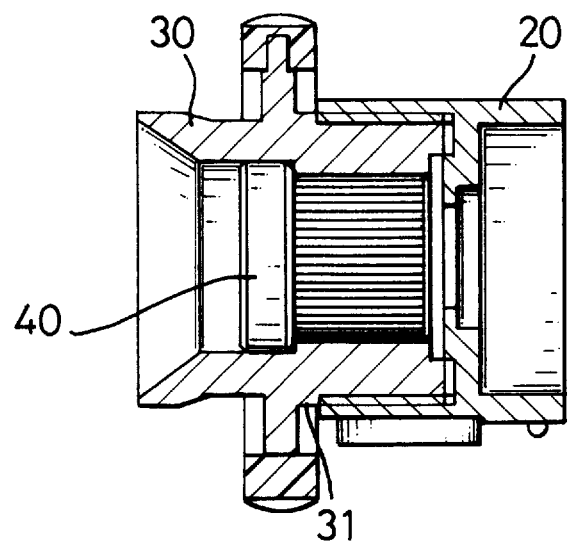
FIG. 4 is a cross sectional view of the device as shown in FIG. 2.
Figure 6:
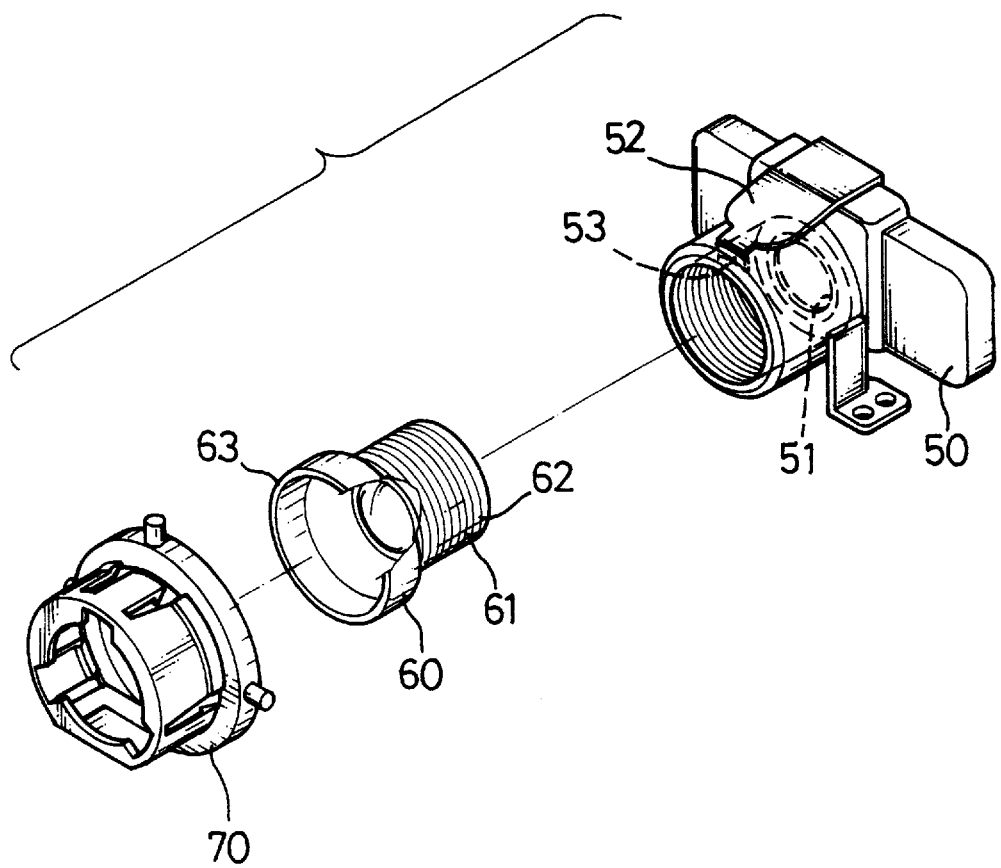
FIG. 6 is an exploded view of a conventional device constructed only for a lens member of fixed length.

FIGS. 4 and 5 show different lens members 40 of different lengths inserted into the tubular projection 31 of the adjusting seat 30. When a lens member 40a, as shown in FIG. 5, has a longer length, the lens member 40a can still be retained within the tubular projection 31 of the adjusting seat 30, because the lens member 40a is securely engaged with only the adjusting seat 30. Furthermore, because the tubular projection 31 is threadingly received within the circular through hole 21 of the seat 20, different lens members 40 having different lengths will not be affected by the limitation of the depth of the circular through hole 21. Thus, when a different lens member 40 is required, the user will only need to replace the adjusting seat 30 together with the lens member 40 with a new set of an adjusting seat 30 and a lens member 40, without removing the seat 20. This reduces cost greatly and is economically efficient.

From the foregoing, it is seen that the objects hereinbefore set forth may readily and efficiently be attained, and since certain changes may be made in the above construction and different embodiments of the invention without departing from the scope thereof, it is intended that all matter contained in the above description or shown in the accompanying drawings shall be interpreted as illustrative and not in a limiting sense.

What is claimed is:

1. A device for mounting one of a number of different lens assemblies having different axial lengths onto a fixed-position seat member, comprising:

a fixed position seat member having a through hole that defines an axis;

female threading located on said seat member;

said female treading forming a circular cylinder that is concentric with said axis;

a lens adjusting seat in the shape of a hollow tube of a circular cross section;

said lens adjusting seat having a hollow tubular front portion and a hollow tubular rear portion;

a tubular shaped lens assembly nonmovably mounted within said lens adjusting seat, with a front portion of said lens assembly located within said hollow tubular front portion of said lens adjusting seat, and with a rear portion of said lens assembly located within said hollow tubular rear portion of said lens adjusting seat;

male threading on said hollow tubular rear portion of said lens adjusting seat;

said male threading forming a circular cylinder that is concentric with said axis; and said male threading mounting said lens adjusting seat to said female threading of said fixed position seat member, for selective movement of said lens adjusting seat and said lens assembly as a unit along said axis and relative to said fixed position seat member.

2. The device of claim 1 including:

undulating teeth located internally of said hollow tubular rear portion of said lens adjusting seat for nonmovably mounting said rear portion of said lens assembly to said lens adjusting seat.

3. The device of claim 2 including:

an adjusting ring mounted on an outer periphery of said lens adjusting seat, rotation of said adjusting ring operating to move said lens adjusting seat and said lens assembly as a unit along said axis relative to said seat member.

4. The device of claim 1 wherein said lens adjusting seat is of an axial length to accommodate lens assemblies having different axial lengths.

* * * * *